US008510503B2

(12) United States Patent
Yagihashi

(10) Patent No.: US 8,510,503 B2
(45) Date of Patent: Aug. 13, 2013

(54) RING BUFFER CIRCUIT AND CONTROL CIRCUIT FOR RING BUFFER CIRCUIT

(75) Inventor: Kiyoto Yagihashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 746 days.

(21) Appl. No.: 12/654,833

(22) Filed: Jan. 6, 2010

(65) Prior Publication Data
US 2010/0174877 A1 Jul. 8, 2010

(30) Foreign Application Priority Data

Jan. 7, 2009 (JP) ................................. 2009-001965

(51) Int. Cl.
*G06F 12/00* (2006.01)
(52) U.S. Cl.
USPC ........... 711/110; 711/154; 711/159; 711/219; 341/97; 710/52; 710/57
(58) Field of Classification Search
None
See application file for complete search history.

(56) References Cited

U.S. PATENT DOCUMENTS

| 5,267,191 | A | * | 11/1993 | Simpson | 365/78 |
|---|---|---|---|---|---|
| 5,426,756 | A | * | 6/1995 | Shyi et al. | 711/159 |
| 5,535,412 | A | * | 7/1996 | Nadehara | 711/110 |
| 5,555,524 | A | * | 9/1996 | Castellano | 365/221 |
| 5,951,635 | A | * | 9/1999 | Kamgar | 365/189.011 |
| 5,960,468 | A | * | 9/1999 | Paluch | 711/219 |
| 5,978,868 | A | * | 11/1999 | Maas | 710/52 |
| 6,457,114 | B1 | * | 9/2002 | Paluch | 711/219 |
| 6,480,912 | B1 | * | 11/2002 | Safi | 710/57 |
| 6,553,448 | B1 | * | 4/2003 | Mannion | 711/2 |
| 6,703,950 | B2 | * | 3/2004 | Yi | 341/97 |
| 6,801,143 | B2 | * | 10/2004 | Oberai et al. | 341/98 |
| 6,934,198 | B1 | * | 8/2005 | Lowe et al. | 365/189.05 |
| 6,937,172 | B1 | * | 8/2005 | Lowe et al. | 341/97 |
| 7,161,849 | B1 | * | 1/2007 | Lowe et al. | 365/189.05 |
| 7,194,500 | B2 | * | 3/2007 | Clift | 708/672 |
| RE40,904 | E | * | 9/2009 | Garde | 711/110 |
| 2003/0046498 | A1 | * | 3/2003 | Roever | 711/154 |
| 2003/0067401 | A1 | * | 4/2003 | Yi | 341/97 |
| 2005/0017753 | A1 | * | 1/2005 | Clift | 326/37 |

FOREIGN PATENT DOCUMENTS

JP 2005-148904 6/2005

OTHER PUBLICATIONS

Steven W. Smith. 1997. The Scientist and Engineer's Guide to Digital Signal Processing. California Technical Publishing, San Diego, CA, USA.*

* cited by examiner

*Primary Examiner* — Sheng-Jen Tsai
*Assistant Examiner* — Ramon A Mercado
(74) *Attorney, Agent, or Firm* — McGinn IP Law Group, PLLC

(57) ABSTRACT

Provided are a ring buffer circuit in which a data full state and a data empty state may be correctly detected without depending on whether read and write operations are synchronous or asynchronous with each other, and a control circuit for the ring buffer circuit. The ring buffer circuit includes: a read and write memory having addresses specified by N bits; a write address counter pointer and a read address counter pointer which are provided for the read and write memory to count (N+1)-bit gray codes; and write and read address converter circuits provided to convert the (N+1)-bit gray codes output from the write and read address counter pointers into N-bit addresses which may be directly designated as write and read addresses of the read and write memory.

17 Claims, 7 Drawing Sheets

| STATE | FOUR-BIT GRAY CODE COUNTER VALUE | CORRECTED STATE |
|---|---|---|
| 0 | 0000 | 0 |
| 1 | 0001 | 1 |
| 2 | 0011 | 2 |
| 3 | 0010 | 3 |
| 4 | 0110 | 4 |
| 5 | 0111 | 5 |
| 6 | 0101 | 6 |
| 7 | 0100 | 7 |
| 8 | 1100 | 0 |
| 9 | 1101 | 1 |
| 10 | 1111 | 2 |
| 11 | 1110 | 3 |
| 12 | 1010 | 4 |
| 13 | 1011 | 5 |
| 14 | 1001 | 6 |
| 15 | 1000 | 7 |

| STATE | FOUR-BIT GRAY CODE COUNTER VALUE | CORRECTED STATE | THREE-BIT GRAY CODE VALUE INDICATING CORRECTED STATE |
|---|---|---|---|
| 0 | 0000 | 0 | 000 |
| 1 | 0001 | 1 | 001 |
| 2 | 0011 | 2 | 011 |
| 3 | 0010 | 3 | 010 |
| 4 | 0110 | 4 | 110 |
| 5 | 0111 | 5 | 111 |
| 6 | 0101 | 6 | 101 |
| 7 | 0100 | 7 | 100 |
| 8 | 1100 | 0 | 000 |
| 9 | 1101 | 1 | 001 |
| 10 | 1111 | 2 | 011 |
| 11 | 1110 | 3 | 010 |
| 12 | 1010 | 4 | 110 |
| 13 | 1011 | 5 | 111 |
| 14 | 1001 | 6 | 101 |
| 15 | 1000 | 7 | 100 |

TRANSITION

| STATE | FOUR-BIT GRAY CODE COUNTER VALUE | FOUR-BIT BINARY COUNTER VALUE | CORRECTED STATE | THREE-BIT BINARY COUNTER VALUE |
|---|---|---|---|---|
| 0 | 0000 | 0000 | 0 | 000 |
| 1 | 0001 | 0001 | 1 | 001 |
| 2 | 0011 | 0010 | 2 | 011 |
| 3 | 0010 | 0011 | 3 | 010 |
| 4 | 0110 | 0100 | 4 | 110 |
| 5 | 0111 | 0101 | 5 | 111 |
| 6 | 0101 | 0110 | 6 | 101 |
| 7 | 0100 | 0111 | 7 | 100 |
| 8 | 1100 | 1000 | 0 | 000 |
| 9 | 1101 | 1001 | 1 | 001 |
| 10 | 1111 | 1010 | 2 | 011 |
| 11 | 1110 | 1011 | 3 | 010 |
| 12 | 1010 | 1100 | 4 | 110 |
| 13 | 1011 | 1101 | 5 | 111 |
| 14 | 1001 | 1110 | 6 | 101 |
| 15 | 1000 | 1111 | 7 | 100 |

RING BUFFER CIRCUIT AND CONTROL CIRCUIT FOR RING BUFFER CIRCUIT

BACKGROUND OF THE INVENTION

1. Field of the Invention

The present invention relates to a ring buffer circuit in which pointers may be circulated within a predetermined address area to perform read and write operations, and to a control circuit for the ring buffer circuit. In particular, the present invention relates to a ring buffer circuit in which read and write operations may be asynchronously performed using a dual port memory, and to a control circuit for the ring buffer circuit.

2. Description of the Related Art

It is generally important for a first-in first-out (FIFO) type data buffer device (hereinafter, referred to as FIFO buffer) to output a signal indicating an internal state to an external circuit (hereinafter, referred to as internal state signal), to prevent writing in a state in which a storage region is full (hereinafter, referred to as full state) or reading in an empty state in which the reading of all write data from the storage region is completed (hereinafter, referred to as empty state). There is a case where the internal state signal to be output may indicate not only the full state or the empty state but also a remaining amount state of the FIFO buffer.

In a general first-in first-out operation for the FIFO buffer, a read and write memory having a predetermined address area is controlled by using a write pointer (WP) indicating a data write address and a read pointer (RP) indicating a data read address. The write pointer (WP) and the read pointer (RP) are used for circulation access to the predetermined address area of the read and write memory. Therefore, the read and write memory is used as a so-called ring buffer, to thereby realize the function of the FIFO buffer. Addresses of the write pointer (WP) and the read pointer (RP) are updated for each writing and reading. After writing and reading in a final address are completed, each of the addresses is returned to a first address to continue writing and reading.

In general, in a case of a synchronous ring buffer circuit in which writing and reading are performed in synchronization with a common clock signal, the addresses of the write pointer (WP) and the read pointer (RP) are updated in synchronization with the common clock signal, and hence the internal state signal is also generated in synchronization with the common clock signal.

In contrast to this, in a case of an asynchronous ring buffer circuit in which data writing and data reading are performed for access, based on separate clock signals, the addresses of the write pointer (WP) and the read pointer (RP) are updated in synchronization with the different clock signals. In this case, the clock signal used for reading is different from the clock signal used for writing, and hence the respective pointers may not be directly referred to. Therefore, it is necessary to synchronize the pointers, based on the clock signal on the referring side of the pointers.

Each of the pointers has a width of a plurality of bits. Therefore, when the pointers are simply synchronized based on a reference destination clock during a metastable state in which a source pointer is changing, a correct pointer value may not be referred to.

In general, in order to solve such a problem, a counter in which the plurality of bit widths are not simultaneously changed during one clock period, that is, a hamming distance is 1 may be used to avoid an erroneous operation at the time of synchronization. In particular, when the ring buffer has an n-bit address space (address space of n-th power of two), a gray code counter which may include n-bits is used. When the gray code counter is provided as the write pointer (WP) or the read pointer (RP), the number of elements becomes slightly larger than in a case of a normal binary counter, but an output value of the gray code counter may be used as an address of the read and write memory without any change.

As described above, it is necessary to generate the internal state signal indicating the internal state of the ring buffer, which is sent to the outside. For example, in the case of each of the full state and the empty state, the write pointer (WP) is equal in value to the read pointer (RP). Therefore, when the write pointer (WP) is simply compared with the read pointer (RP), the full state and the empty state may not distinguished from each other. Thus, there is a method of generating an internal state signal for distinguishing the full state and the empty state from each other, based on additional bits inverted when each of the pointers is returned from a final address to zero (hereinafter, referred to as additional bits).

This method is described in FIG. 2 of JP 2005-148904 A. As illustrated in FIG. 2 of JP 2005-148904 A, an additional bit (one bit) is provided for each of a ten-bit write pointer and a ten-bit read pointer, and thus eleven-bit information is used to generate the internal state signal. The lower ten bits are used for each of the pointers.

The following analysis is provided according to the present invention. When the method of distinguishing the full state and the empty state from each other based on the additional bits described in JP 2005-148904 A is to be applied to the asynchronous ring buffer described above, there is the following problem. When the write pointer (WP) and the read pointer (RP) change, the additional bits simultaneously change. Therefore, even in a case where the write pointer (WP) and the read pointer (RP) are gray-encoded, when the additional bits are included, a plurality of bits simultaneously change, and hence the erroneous operation may not be avoided.

Further, if the entire write pointer (WP) or read pointer (RP) which includes the additional bit is gray-encoded, the number of gray code bits becomes lager than the number of bits required for addressing to the read and write memory. Therefore, the addressing to the read and write memory may not be realized directly based on the gray code bits.

SUMMARY OF THE INVENTION

According to an aspect of the present invention, a ring buffer circuit includes: a read and write memory having addresses specified by N bits (N is an integer equal to or larger than two); a write address counter pointer for counting an (N+1)-bit gray code, the write address counter pointer being a counter pointer having an address which is updated for each writing into the read and write memory and returned to a first address to continue counting when the address reaches a final address; a read address counter pointer for counting an (N+1)-bit gray code, the read address counter pointer being a counter pointer having an address which is updated for each reading from the read and write memory and returned to the first address to continue counting when the address reaches the final address; a write address converter circuit for converting the (N+1)-bit gray code output from the write address counter pointer into an N-bit address which may be directly designated as a write address of the read and write memory; and a read address converter circuit for converting the (N+1)-bit gray code output from the read address counter pointer into an N-bit address which may be directly designated as a read address of the read and write memory.

Further, according to another aspect of the present invention, a control circuit for a ring buffer circuit having addresses specified by N bits (N is an integer equal to or larger than two) includes: a read address counter pointer for designating a read address of the ring buffer circuit; a write address counter pointer for designating a write address of the ring buffer circuit; and a comparison operation section for comparing the read address and the write address to detect whether or not the ring buffer circuit is empty and whether or not the ring buffer circuit is full, in which the read address counter pointer and the write address counter pointer each include a counter pointer for an (N+1)-bit gray code and the control circuit further includes an address converter circuit for converting the (N+1)-bit gray codes output from the read address counter pointer and the write address counter pointer into N-bit addresses for the ring buffer circuit.

According to the prevent invention, there can be obtained a ring buffer circuit in which a data full state and a data empty state may be correctly detected without depending on whether read and write operations are synchronous or asynchronous with each other, and a control circuit for the ring buffer circuit.

DETAILED DESCRIPTION OF THE PREFERRED EMBODIMENTS

Embodiments of the present invention are described with reference to the attached drawings if necessary. The drawings and reference symbols which are referred to in the description of the embodiments are examples of the embodiments, and thus variations of the embodiments according to the present invention are not limited thereto.

Figure 1:
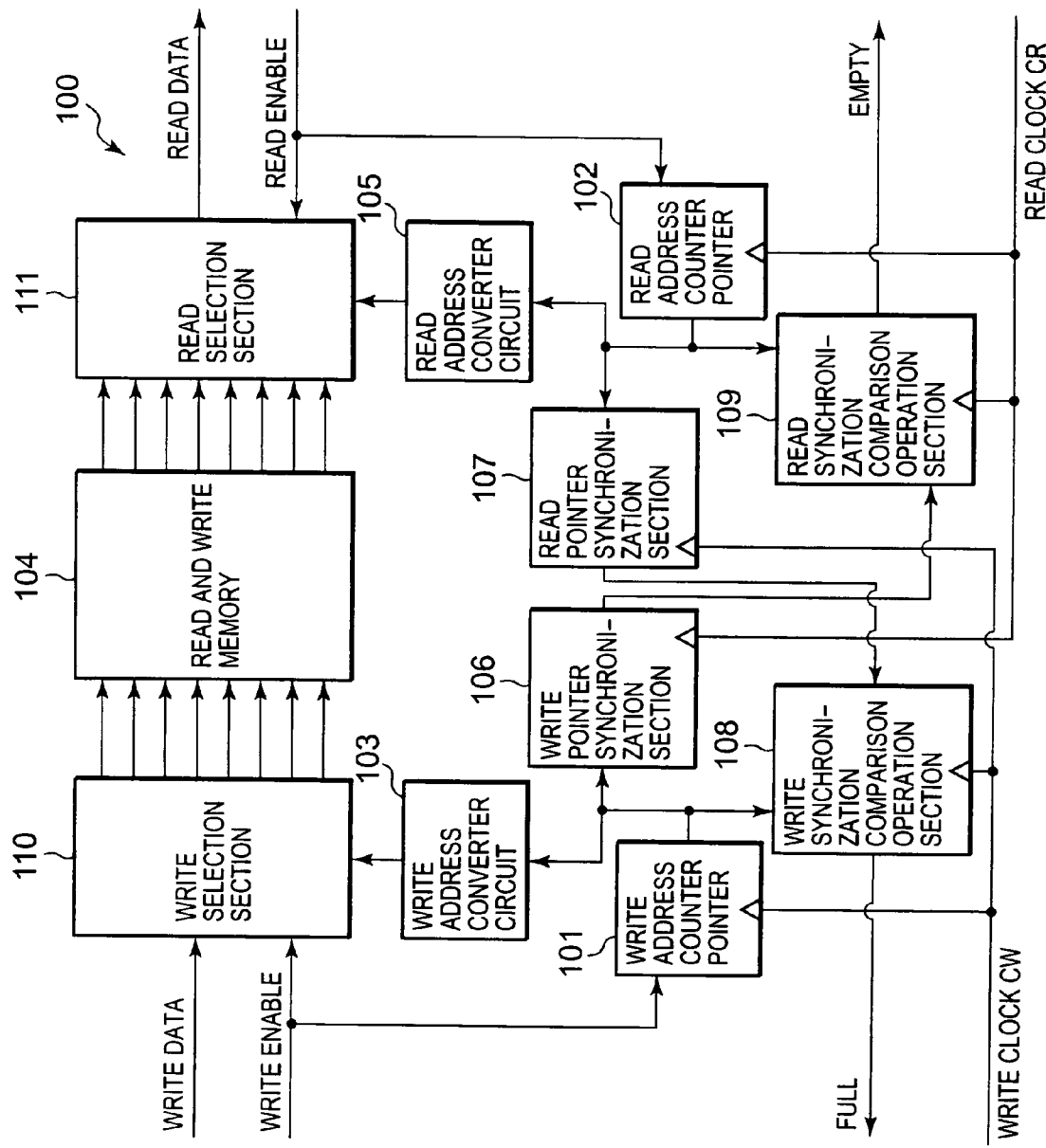
FIG. 1 is a block diagram illustrating the entire structure of a ring buffer circuit according to Embodiment 1 of the present invention.
Figure 6:
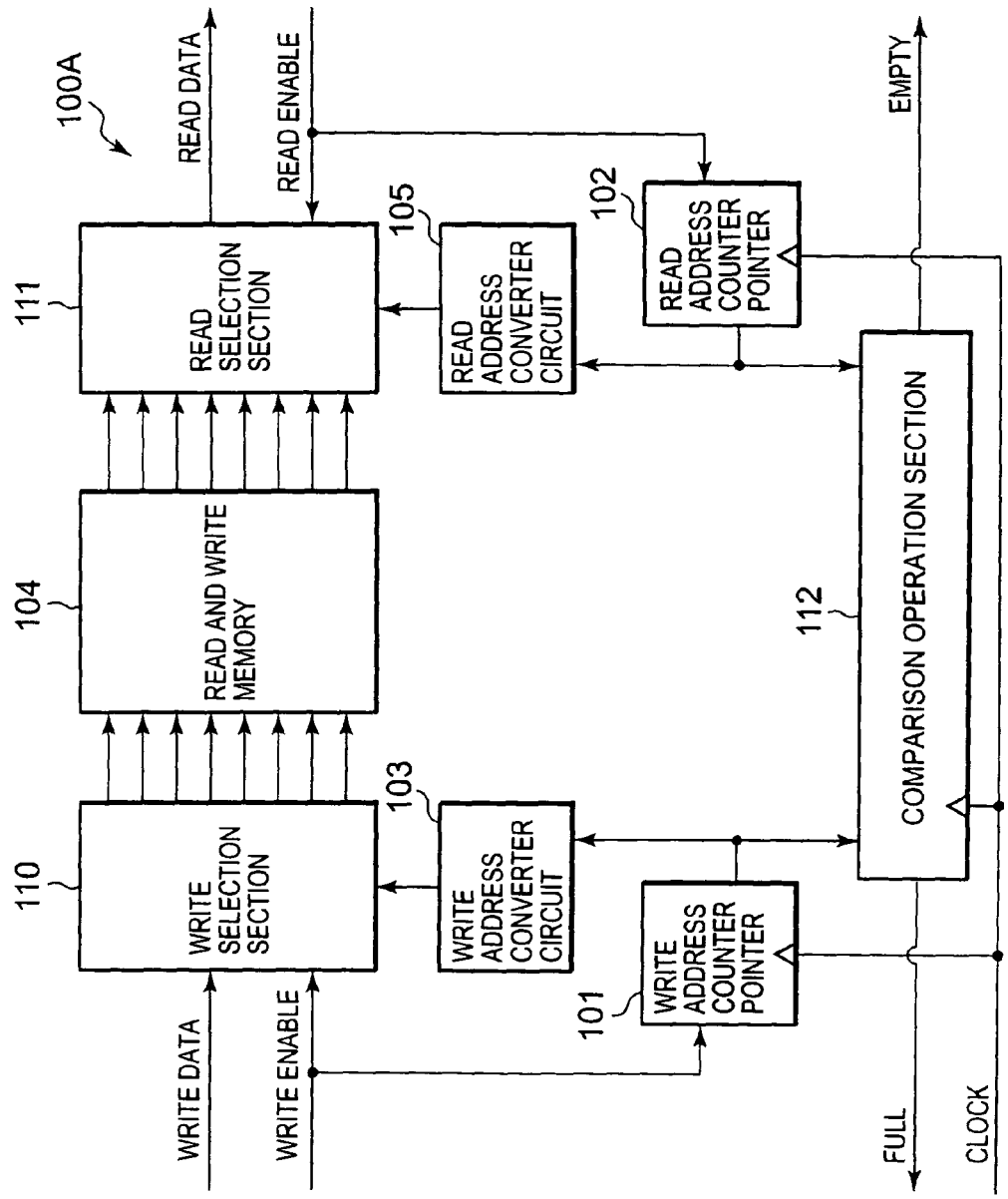
FIG. 6 is a block diagram illustrating the entire structure of a ring buffer circuit according to Embodiment 2 of the present invention.
Figure 7:
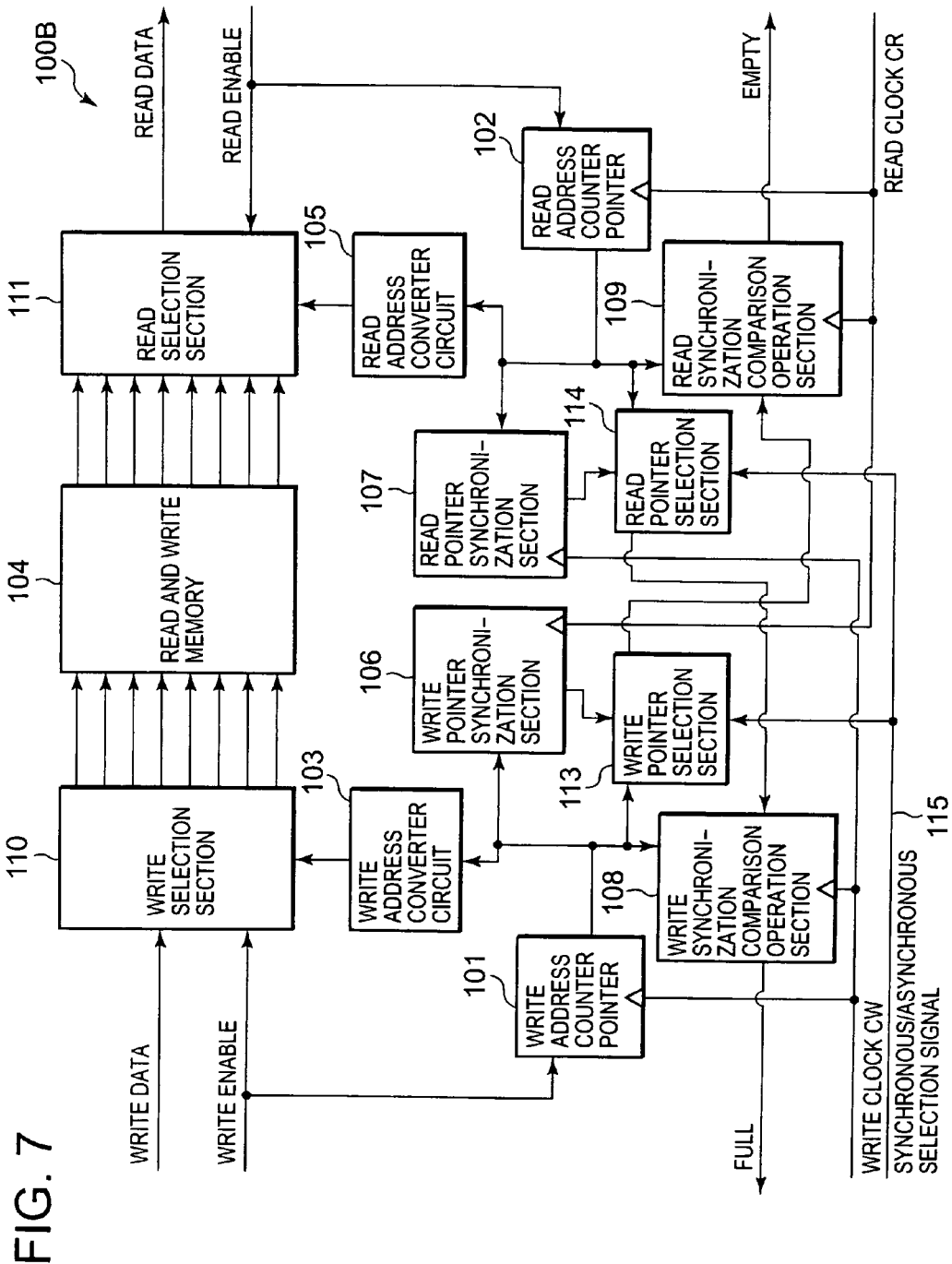
FIG. 7 is a block diagram illustrating the entire structure of a ring buffer circuit according to Embodiment 3 of the present invention.

As illustrated in each of FIGS. 1, 6, and 7, the ring buffer circuit (100, 100A, or 100B) according to each of the embodiments of the present invention includes: a read and write memory 104 having addresses specified by N bits (N is an integer equal to or larger than two); a write address counter pointer 101 for counting an (N+1)-bit gray code, the write address counter pointer being a counter pointer having an address which is updated for each writing into the read and write memory 104 and returned to a first address to continue counting when the address reaches a final address; a read address counter pointer 102 for counting an (N+1)-bit gray code, the read address counter pointer being a counter pointer having an address which is updated for each reading from the read and write memory 104 and returned to the first address to continue counting when the address reaches the final address; a write address converter circuit 103 for converting the (N+1)-bit gray code output from the write address counter pointer 101 into an N-bit address which may be directly designated as a write address of the read and write memory 104; and a read address converter circuit 105 for converting the (N+1)-bit gray code output from the read address counter pointer 102 into an N-bit address which may be directly designated as a read address of the read and write memory 104. The write address counter pointer and the read address counter pointer count the gray codes. Therefore, even when a counter pointer value is referred to at an arbitrary timing, an erroneous value may not be referred to, without depending on whether read and write operations are synchronous or asynchronous with each other. The number of bits of each of the address counter pointers is larger by one bit than the number of bits of the actual read and write memory, and hence whether the read and write memory is full or empty may be easily determined. The write address converter circuit and the read address converter circuit convert, into addresses which may be directly designated as addresses of the read and write memory, the gray codes output from the write address counter pointer and the read address counter pointer which have the number of bits larger by one bit than the number of bits of the actual read and write memory. Therefore, the access to a correct address of the read and write memory may be achieved.

As illustrated in each of FIGS. 1 and 7, the ring buffer circuit (100 or 100B) according to each of the embodiments of the present invention further includes: in a case where the read and write memory 104 is a memory for performing writing in synchronization with a write clock CW and reading in synchronization with a read clock CR, a read pointer synchronization section 107 for outputting the gray code of the read address counter pointer 102 in synchronization with the write clock CW; and a write synchronization comparison operation section 108 for comparing the gray code from the write address counter pointer 101 with the gray code output from the read pointer synchronization section 107. The read pointer synchronization section 107 outputs the gray code of the read address counter pointer in synchronization with the write clock. Therefore, even when the write clock is asynchronous to the read clock, the write address and the read address may be compared with each other in synchronization with the write clock.

As illustrated in each of FIGS. 1 and 7, the ring buffer circuit (100 or 100B) according to each of the embodiments of the present invention further includes the write synchronization comparison operation section 108 for comparing the gray code from the write address counter pointer 101 with the gray code output from the read pointer synchronization section 107, and detecting that the read and write memory 104 is full when higher two bits of the gray code from the write address counter pointer 101 are not equal to higher two bits of the gray code output from the read pointer synchronization section 107 and when lower bits other than the higher two bits of the gray code from the write address counter pointer 108 are equal to lower bits other than the higher two bits of the gray code output from the read pointer synchronization section 107. That is, in the case where the read and write memory is full, when the number of addresses of the read and write memory is set to the n-th power of two, a state of the gray code of the write address counter pointer 101 and a state of the gray code of the read address counter pointer 102 are shifted from each other by the n-th power of two. Therefore, in view of the characteristic of the gray code, an (N+1)-th bit and N-th bit of an (N+1)-bit gray code of the write address counter pointer are not equal to an (N+1)-th bit and N-th bit of an (N+1)-bit gray code of the read address counter pointer 102, and respective bits equal to or lower than an (N−1)-th bit of the (N+1)-bit gray code of the write address counter pointer 101 are equal to respective bits equal to or lower than an (N−1)-th bit of the (N+1)-bit gray code of the read address counter pointer 102. The ring buffer circuit becomes full in synchronization with the writing of data, and hence the full state is desirably detected in synchronization with the write clock.

As illustrated in each of FIGS. 1 and 7, the ring buffer circuit (100 or 100B) according to each of the embodiments of the present invention further includes: in a case where the read and write memory 104 is a memory for performing writing in synchronization with a write clock CW and reading in synchronization with a read clock CR, a write pointer synchronization section 106 for outputting the gray code of the write address counter pointer 101 in synchronization with the write clock CR; and a read synchronization comparison operation section 109 for comparing the gray code from the read address counter pointer 102 with the gray code output from the write pointer synchronization section 106. The write pointer synchronization section 106 outputs the gray code of the write address counter pointer 101 in synchronization with the read clock. Therefore, even when the write clock is asynchronous to the read clock, the write address and the read address may be compared with each other in synchronization with the read clock.

As illustrated in each of FIGS. 1 and 7, the ring buffer circuit (100 or 100B) according to each of the embodiments of the present invention further includes the read synchronization comparison operation section 109 for comparing the gray code from the read address counter pointer 102 with the gray code output from the write pointer synchronization section 106, and detecting that the read and write memory 104 is empty when N+1 bits of the gray code from the read address counter pointer 102 are all equal to N+1 bits of the gray code output from the write pointer synchronization section 106. When the read and write memory 104 is empty, the gray code output from the read address counter pointer 102 is equal to the gray code output from the write address counter pointer 101. Therefore, whether or not all bits of the gray code of the read address counter pointer are equal to all bits of the gray code of the write address counter pointer is desirably detected. The read and write memory 104 becomes empty due to the reading of data. Thus, it is desirable to detect whether or not the read and write memory is empty in synchronization with the read clock.

As illustrated in each of FIGS. 1 and 7, the ring buffer circuit (100 or 100B) according to each of the embodiments of the present invention further includes the read and write memory 104 which includes a dual port memory 104 having a write port 110 and a read port 111, in which the write clock CW and the read clock CR are asynchronous with each other. When the write clock is asynchronous to the read clock, it is desirable to separately perform the write and read operations on the read and write memory 104 as the dual port memory 104 having the write port 110 and the read port 111.

As illustrated in FIG. 7, the ring buffer circuit 100B according to each of the embodiments of the present invention further includes the read and write memory 104 which includes a dual port memory 104 having a write port 110 and a read port 111, for performing writing from the write port 110 in synchronization with the write clock CW and reading from the read port 111 in synchronization with the read clock CR, and further includes: a read pointer synchronization section 107 for outputting the gray code from the read address counter pointer 102 in synchronization with the write clock CW; a write pointer synchronization section 106 for outputting the gray code from the write address counter pointer 101 in synchronization with the read clock CR; a write pointer selection section 113 for selectively outputting one of the gray code output from the write 20, address counter pointer 101 and the gray code output from the write pointer synchronization section 106 based on a synchronous/asynchronous selection signal 115 indicating whether or not the write clock CW and the read clock CR are synchronous each other; a read pointer selection section 114 for selectively outputting one of the gray code output from the read address counter pointer 102 and the gray code output from the read pointer synchronization section 107, based on the synchronous/asynchronous selection signal 115; a write synchronization comparison operation section for comparing the gray code from the write address counter pointer 101 with the gray code output from the read pointer selection section 114; and a read synchronization comparison operation section 109 for comparing the gray code from the read address counter pointer 102 with the gray code output from the write pointer selection section 113. According to the structure described above, the ring buffer circuit capable of operating without depending on whether the write clock and the read clock are synchronous or asynchronous with each other is obtained. When the write clock and the read clock are synchronous, the write pointer synchronization section and the read pointer synchronization section may be skipped based on the synchronous/asynchronous selection signal, and hence at least one of the full and empty states of the read and write memory may be detected at high speed.

As illustrated in each of FIGS. 1, 6, and 7, a control circuit for the ring buffer circuit (100, 100A, or 100B) according to each of the embodiments of the present invention further includes: a ring buffer circuit (100, 100A, or 100B) having addresses specified by N bits (N is an integer equal to or larger than two); a read address counter pointer 102 for designating a read address of the ring buffer circuit (100, 100A, or 100B); a write address counter pointer 101 for designating a write address of the ring buffer circuit (100, 100A, or 100B); and a comparison operation section (108, 109, or 112) for comparing the read address and the write address to detect whether or not the ring buffer circuit (100, 100A, or 100B) is empty and whether or not the ring buffer circuit is full, in which the read address counter pointer 102 and the write address counter pointer 101 each include a counter pointer for an (N+1)-bit gray code, and the control circuit further includes an address converter circuit (103 or 105) for converting the (N+1)-bit gray codes output from the read address counter pointer 102 and the write address counter pointer 101 into N-bit addresses for the ring buffer circuit (100, 100A, or 100B). When the control circuit is combined with the read and write memory, the ring buffer may be constructed. The comparison operation section may be separately provided for writing and reading or may be shared.

As illustrated in each of FIGS. 1, 6, and 7, the control circuit for the ring buffer circuit (100, 100A, or 100B) according to each of the embodiments of the present invention further includes the address converter circuit (103 or 105) which includes: a read address converter circuit 105 for converting the (N−1)-bit gray code output from the read address counter pointer 102 into an N-bit read address; and a write address converter circuit 103 for converting the (N+1)-bit gray code output from the write address counter pointer 101 into an N-bit write address. The address converter circuit is separately provided for reading and writing, and hence the read address and the write address may be simultaneously converted in parallel. Even when results obtained by conversion by the address converter circuits are not held in registers or the like, the read address and the write address may be directly output to the read and write memory based on the outputs of the address converter circuits.

Figures 2, 3:
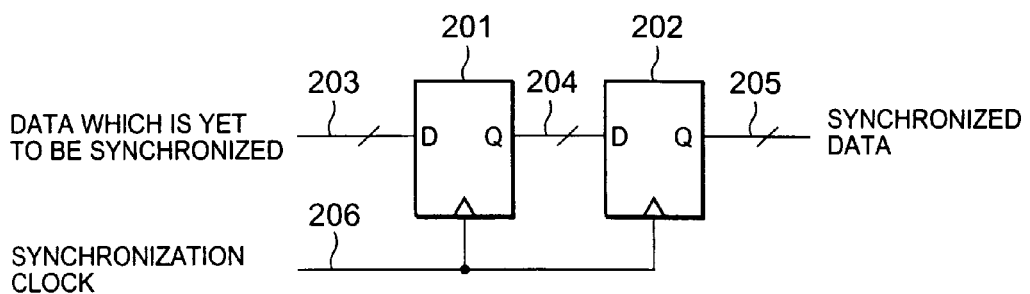
FIG. 2 is a circuit diagram illustrating one of a write pointer synchronization section and a read pointer synchronization section in the ring buffer circuit according to Embodiment 1 of the present invention.
FIG. 3 illustrates a state transition of any one of a write address counter pointer and a read address counter pointer in the ring buffer circuit according to Embodiment 1 of the present invention.

Further, in the control circuit for the ring buffer circuit (100, 100A, or 100B) according to each of the embodiments of the present invention, in a case where an initial gray code address is a 0th address and an input (N+1)-bit gray code address value is at least an (N-th power of two)-th address or later, the read address converter circuit 105 and the write address converter circuit 103 each convert the input (N+1)-bit gray code address into an address preceding by the N-th power of two. As illustrated in FIG. 3, for example, in a case where N is 3, when a gray code address of 4 (=N+1) bits is an eighth or subsequent address (state 8 or more in FIG. 3), the gray code address is converted into an address preceding by eight (state in which state number is reduced by eight). The most significant bit may be dropped. FIG. 3 illustrates the case where N is 3. In view of the characteristic of the gray code, when N is equal to or larger than 2, the conversion may be applied to a case where N is arbitrary.

As illustrated in FIG. 4, in the control circuit for the ring buffer circuit (100, 100A, or 100B) according to each of the embodiments of the present invention, the read address converter circuit 105 and the write address converter circuit 103 each directly set, as output bits, input bits including a least significant bit to an (N−1)-th bit, of an input (N+1)-bit gray code, and further set, as an N-th output bit, an exclusive OR bit of higher two input bits including an N-th bit and an (N+1)-th bit, to thereby convert an address of the (N+1)-bit gray code into an N-bit gray code address. FIG. 4 illustrates the case where N is 3. In view of the characteristic of the gray code, when N is equal to or larger than 2, the conversion may be applied to a case where N is arbitrary.

Figure 8:
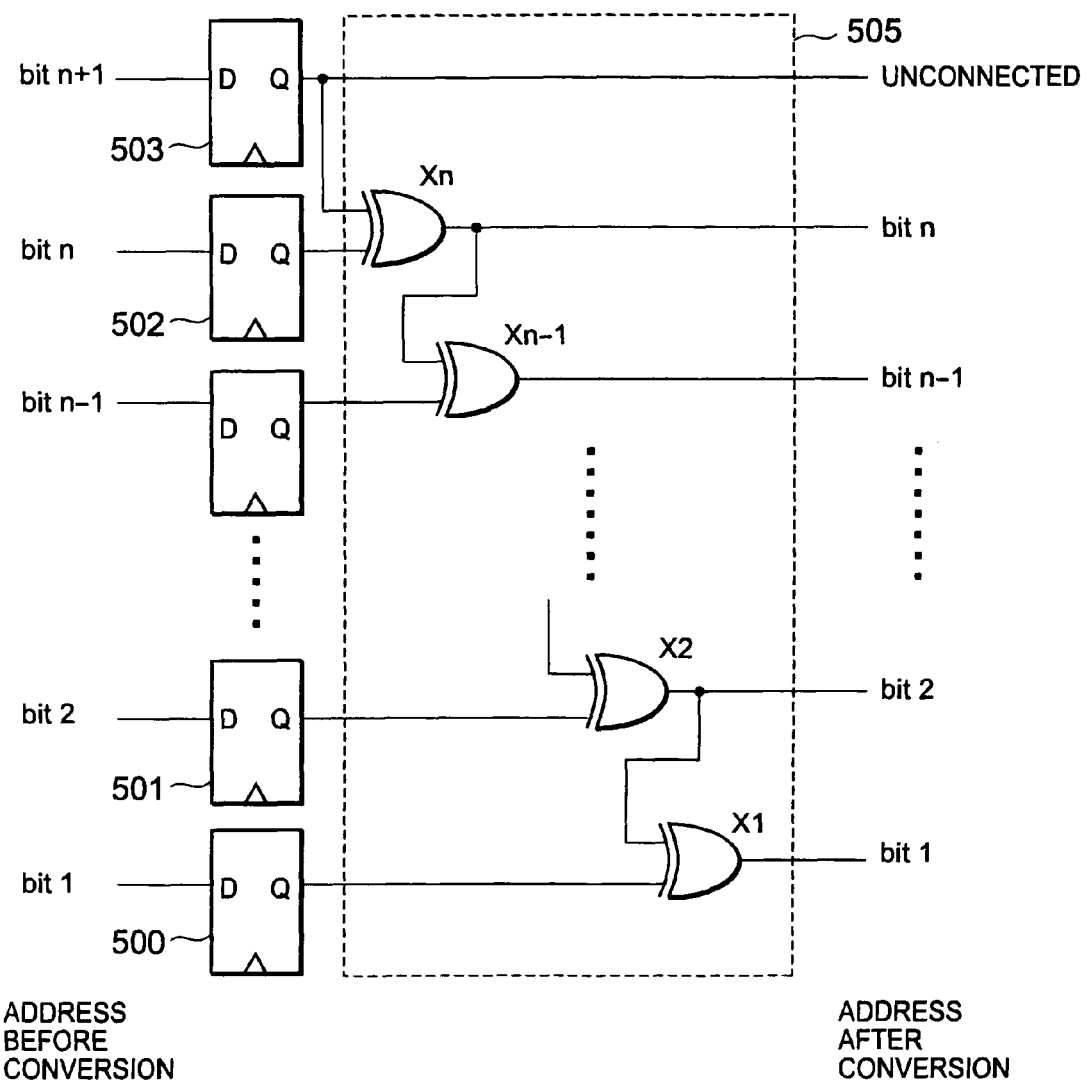
FIG. 8 is a circuit diagram illustrating a detailed structure of an (N+1)-bit gray binary converter circuit illustrated in FIG. 5A.

As illustrated in each of FIGS. 5 and 8, in the control circuit for the ring buffer circuit (100, 100A, or 100B) according to each of the embodiments of the present invention, the read address converter circuit 105 and the write address converter circuit 103 each include a circuit for converting an input (N+1)-bit gray code address into an (N+1)-bit binary code and outputting a lower N-bit binary code of the converted (N+1)-bit binary code, to thereby convert the (N+1)-bit gray code address into an N-bit binary code address. As illustrated in FIGS. 5 and 8, in view of the characteristic of the gray code, the structure described above may be applied to a case where N is an arbitrary value equal to or larger than 2.

As illustrated in each of FIGS. 1 and 7, the control circuit for the ring buffer circuit (100 or 100B) according to each of the embodiments of the present invention is capable of controlling the ring buffer circuit (100 or 100B) into which data is written in synchronization with a write clock CW and from which data is read in synchronization with a read clock CR which is asynchronous with the write clock, and further includes: a read pointer synchronization section 107 for outputting the gray code from the read address counter pointer 102 in synchronization with the write clock CW; and a write pointer synchronization section 106 for outputting the gray code from the write address counter pointer 101 in synchronization with the read clock CR. In the control circuit, the comparison operation section (108 or 109) includes: a write synchronization comparison operation section 108 for comparing the gray code from the write address counter pointer 101 with the gray code output from the read pointer synchronization section 107 in synchronization with the write clock CW; and a read synchronization comparison operation section 109 for comparing the gray code from the read address counter pointer 102 with the gray code output from the write pointer synchronization section 106 in synchronization with the read clock CR. With the structure described above, the write synchronization comparison operation section may be operated in synchronization with the write clock and the read synchronization comparison operation section may be operated in synchronization with the read clock.

As illustrated in each of FIGS. 1 and 7, in the control circuit for the ring buffer circuit (100 or 100B) according to each of the embodiments of the present invention, the write synchronization comparison operation section 108 detects that the ring buffer circuit is full when higher two bits of the gray code from the write address counter pointer 101 are not equal to higher two bits of the gray code output from the read pointer synchronization section 107 and when lower bits other than the higher two bits of the gray code from the write address counter pointer 101 are all equal to lower bits other than the higher two bits of the gray code output from the read pointer synchronization section 107. For example, FIG. 5 illustrates the case of N=3. When the value of the write address counter pointer and the value of the read address counter pointer are different from each other by "8 (=N-th power of 2)" in state number, the ring buffer circuit becomes full. As described above, with respect to the values of the gray code counters which are different from each other by 8 in state number, higher two bits are not equal and respective lower bits other than the higher two bits are all equal. In view of the characteristic of the gray code, when N is an arbitrary value equal to or larger than 2, the relationship described above is established.

As illustrated in each of FIGS. 1 and 7, in the control circuit for the ring buffer circuit (100 or 100B) according to each of the embodiments of the present invention, the read synchronization comparison operation section 109 detects that the ring buffer circuit is empty when an N+1 bit value of the gray code from the read address counter pointer 102 is equal to an N+1 bit value of the gray code output from the write pointer synchronization section 106. That is, when the gray code of the read address counter pointer is equal to the gray code of the write address counter pointer, the data of the ring buffer circuit is empty.

For example, as illustrated in FIG. 7, the control circuit for the ring buffer circuit 100B according to each of the embodiments of the present invention further includes: a write pointer selection section 113 for selectively outputting one of the gray code output from the write address counter pointer 101 and the gray code output from the write pointer synchronization section 106, based on a synchronous/asynchronous selection signal 115 indicating whether or not the write clock CW and the read clock CR are synchronous each other; and a read pointer selection section 114 for selectively outputting one of the gray code output from the read address counter pointer 102 and the gray code output from the read pointer synchronization section 107, based on the synchronous/asynchronous selection signal 115.

In the control circuit, the write synchronization comparison operation section 108 compares the gray code from the write address counter pointer 101 with the gray code output from the read pointer selection section 114, and the read synchronization comparison operation section 109 compares the gray code from the read address counter pointer 102 with the gray code output from the write pointer selection section 113. With the structure described above, the ring buffer circuit capable of operating without depending on whether or not the write clock and the read clock are synchronous or asynchronous with each other is obtained. When the write clock and the read clock are synchronous, the write pointer synchronization section and the read pointer synchronization section may be skipped based on the synchronous/asynchronous selection signal, and hence at least one of the full and empty states of the read and write memory may be detected at high speed.

As illustrated in each of FIGS. 1, 6, and 7, in the control circuit for the ring buffer circuit (100, 100A, or 100B) according to each of the embodiments of the present invention, the comparison operation section (108, 109, or 112) compares the gray code from the read address counter pointer 102 with the gray code output from the write address counter pointer 101, detects that the ring buffer circuit is full when higher two bits of the gray code from the read address counter pointer 102 are not equal to higher two bits of the gray code output from the write address counter pointer 101 and when lower bits other than the higher two bits of the gray code from the read address counter pointer 102 are all equal to lower bits other than the higher two bits of the gray code output from the write address counter pointer 101, and detects that the ring buffer circuit is empty when N+1 bits of the gray code from the read address counter pointer 102 are all equal to N+1 bits of the gray code output from the write address counter pointer 101. That is, according to the control circuit for the ring buffer circuit, whether the ring buffer circuit is full or empty may be detected without depending on whether the write clock and the read clock are synchronous or asynchronous with each other. Hereinafter, the embodiments of the present invention are described in more detail with reference to the attached drawings.

[Embodiment 1]

FIG. 1 is a block diagram illustrating the structure of the ring buffer circuit according to Embodiment 1. In FIG. 1, the ring buffer circuit includes: the dual port memory having the write selection section 110 and the read selection section 111 which respectively serve as the write port and read port of the read and write memory 104; and the control circuit for causing the dual port memory to serve as the ring buffer. The control circuit for the ring buffer principally includes the write address counter pointer 101, the read address counter pointer 102, the write address converter circuit 103, the read address converter circuit 105, the write pointer synchronization section 106, the read pointer synchronization section 107, the write synchronization comparison operation section 108, and the read synchronization comparison operation section 109.

The write selection section 110 writes data into an address of the read and write memory 104 which is indicated by the write address converter circuit 103 when the write enable signal is at a high level.

The read selection section 111 reads data from an address of the read and write memory 104 which is indicated by the read address converter circuit 105 when the read enable signal is at a high level.

The write address counter pointer 101 is a counter pointer for designating the write address and has a pointer value updated for each data writing. The read address counter pointer 102 is a counter pointer for designating the read address and has a pointer value updated for each data reading.

The write pointer synchronization section 106 performs the bit output synchronization of the write address counter pointer 101. The read pointer synchronization section 107 performs the bit output synchronization of the read address counter pointer 102. FIG. 2 is a circuit diagram illustrating a structural example of any one of the write pointer synchronization section 106 and the read pointer synchronization section 107. In FIG. 2, multi-bit data 203 which is not synchronized is latched into D flip-flops 201 and 202 two times at a synchronization clock 206 to generate synchronized data 205.

The write synchronization comparison operation section 108 generates the internal state signal indicating that the FIFO buffer is full in synchronization with the write clock. The read synchronization comparison operation section 109 generates the internal state signal indicating that the FIFO buffer is empty in synchronization with the read clock.

Circuit structures and operations of the write address counter pointer 101 and the read address counter pointer 102 are described. The circuit structures and operations of the write address counter pointer 101 and the read address counter pointer 102 are identical to each other, and hence the write address counter pointer 101 is typically described.

When the read and write memory 104 has addresses specified by N bits, the write address counter pointer 101 serves as an (N+1)-bit gray code counter. A known structure may be used for the gray code counter.

FIG. 3 illustrates a state transition of the write address counter pointer 101. FIG. 3 illustrates the case of N=3. In the case of N=3, the write address counter pointer 101 has four bits. For each writing, a state in the "STATE" column is sequentially transited. For example, the state is transited from State-0 to State-1. Next, State-1 is transited to State-2. When writing is performed in State-15, the state is returned to State-0. The write address counter pointer 101 is the gray code counter. Therefore, as is apparent from the "COUNTER VALUE" column of FIG. 3, the number of bits of the counter value changed by the update of the state is always one. In the case of N=3, the state is sequentially transited among 16 states (state of (N+1)-th power of 2) in total including State-0 to State-15. In a case of one-to-one correspondence with the 16 states, the address of the read and write memory having the eight addresses may not be designated. Therefore, as illustrated in the "CORRECTED STATE" column of FIG. 3, the address conversion needs to be performed such that the eight addresses may be sequentially assigned to the 16 states in cycles.

Thus, the write address converter circuit 103 is required so as to convert the address values of "(N+1)-th power of two" of the gray code into the address values of "N-th power of two". The write address counter pointer 101 has been described, but the state tradition illustrated in FIG. 3 may be applied to the read address counter pointer 102 without any change. The read address counter pointer 102 also requires the read address converter circuit 105 so as to convert the address values of the "(N+1)-th power of two" into the address values of the "N-th power of two".

Figures 4A, 4B:
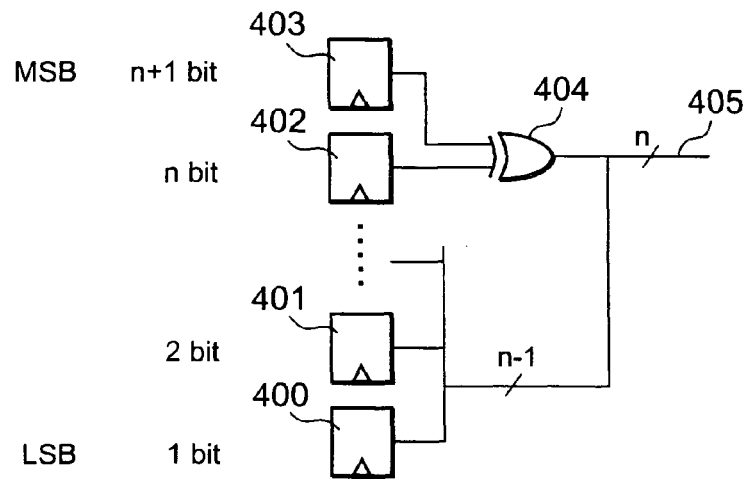
FIG. 4A is a circuit diagram illustrating one of a write address converter circuit and a read address converter circuit in the ring buffer circuit according to Embodiment 1 of the present invention.
FIG. 4B illustrates addresses before and after conversion in the write address converter circuit and the read address converter circuit.

Next, the write address converter circuit 103 and the read address converter circuit 105 in Embodiment 1 are described. FIG. 4A is a circuit diagram illustrating a first structural example of anyone of the write address converter circuit 103 and the read address converter circuit 105, and FIG. 4B illustrates addresses before and after conversion. In the first structural example of the address converter circuit, the address conversion from the (N+1)-bit gray code counter value to the N-bit gray code counter value is performed such that the addresses of the N-th power of two of the read and write memory 104 may be selected. FIG. 4B illustrates, in the case of N=3, a four-bit gray code counter value, a state after address conversion, and a three-bit gray code counter value after address conversion. As is apparent from the three-bit (N-bit) gray code value indicating State-8 (state of N-th power of two) after address conversion, the three-bit (N-bit) gray code counter value corresponds to a three-bit (N-bit) value in which an EXOR value of higher two bits of a four-bit ((N+1)-bit) gray code value is set as the most significant bit and lower two bits ((N−1) bits) of the four-bit ((N+1)-bit) gray code value are set as lower two bits ((N−1) bits) of the gray code address after address conversion without being changed. Therefore, as illustrated in FIG. 4A, when an (N+1)-th bit 403 and an N-th bit 402 of the gray code counter are EXORed by an EXOR circuit 404 and then combined with the least significant bit to an (N−1)-th bit to thereby produce an N-bit signal 405, the address conversion may be realized.

Figures 5A, 5B:
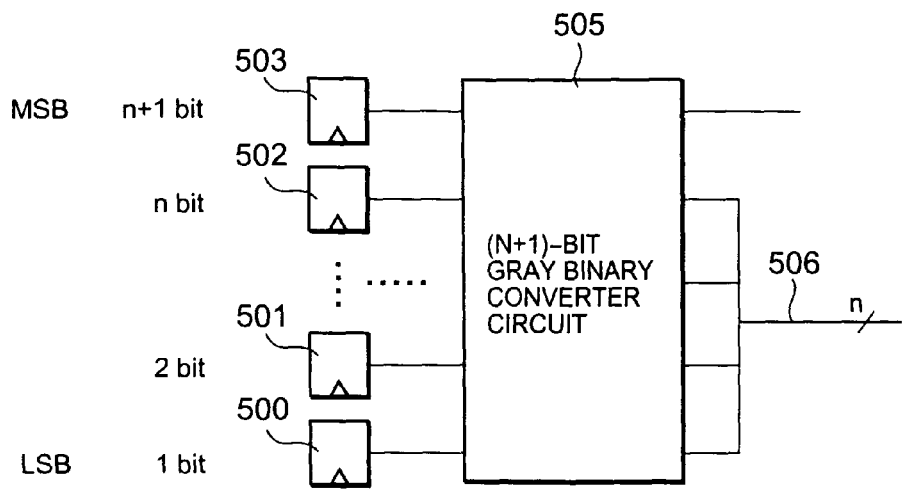
FIG. 5A is a circuit diagram illustrating one of another write address converter circuit and another read address converter circuit in the ring buffer circuit according to Embodiment 1 of the present invention.
FIG. 5B illustrates addresses before and after conversion in further another write address converter circuit and further another read address converter circuit.

A second structural example of any one of the write address converter circuit 103 and the read address converter circuit 105 for converting the (N+1)-bit gray code into an N-bit binary code, is described with reference to FIGS. 5 and 8. FIG. 5A is a block diagram illustrating the second structural example and FIG. 5B illustrates a relationship between address counter values before and after address conversion. FIG. 8 is a circuit diagram illustrating the address converter circuit.

In the second structural example of the address converter circuit, the (N+1)-bit gray code counter value is converted into an (N+1)-bit binary value and then an N-bit binary value is extracted from the (N+1)-bit address value after binary conversion, and hence the addresses of the N-th power of two may be designated. In FIG. 5A, data flip-flops 500 to 503 are provided in the output stage of any one of the address counter pointers (101 and 102). The data flip-flops 500 to 503 hold an (N+1)-bit gray code. The gray code is converted into a binary code by an (N+1)-bit gray binary converter circuit 505 and a signal 506 having lower N-bits of the binary code is generated, and hence the addresses of the N-th power of two of the read and write memory 104 may be directly designated. FIG. 8 illustrates a specific circuit structure of the (N+1)-bit gray binary converter circuit 505. An (N+1)-th bit of the binary code is equal to the (N+1)-th bit of the gray code, and each of the other bits may be calculated by exclusive OR logic operation between a corresponding bit of the gray code and a bit higher than the corresponding bit by one, of the binary code. After the gray code is converted into the binary code, the (N+1)-bit binary code is easily converted into an N-bit binary code. That is, when the most significant bit of the (N+1)-bit binary code is neglected and the least significant bit to an N-th bit are extracted, the (N+1)-bit binary code may be converted into the N-bit binary code, and hence the addresses of the N-th power of two may be designated. FIG. 5B illustrates a relationship among the (N+1)-bit gray code counter value, the (N+1)-bit binary counter value, and the N-bit binary counter value in the case of N=3. It is apparent that the N-bit binary counter value is equal to a lower N-bit value of the (N+1)-bit binary counter value and exhibits the state of the N-th power of two.

The address converter circuit represented by any one of the first and second structural examples may convert the (N+1)-bit gray code counter value into the address of the N-th power of two. The address obtained by the write address converter circuit and the address obtained by the read address converter circuit are input to the write selection section 110 and the read selection section 111, respectively, to select the write address and read address of the read and write memory 104.

Next, the structures of the write synchronization comparison operation section 108 and the read synchronization comparison operation section 109 are described.

The write synchronization comparison operation section 108 compares the (N+1)-bit gray code output from the write address counter pointer 101 with the (N+1)-bit gray code which is output from the read address counter pointer 102 and synchronous with the write clock CW by the read pointer synchronization section 107, to detect whether or not the ring buffer is full. Specifically, the gray codes are EXORed for each bit. When each EXOR value with respect to higher two bits exhibits one and each EXOR value with respect to lower (n−1) bits exhibits zero, the full state may be determined. For example, in FIG. 3, when the gray code of the write address counter pointer is "0110" and the gray code of the read address counter pointer is "1010", an EXOR value exhibits "1100", and hence the full state is determined.

That is, the number of addresses of the read and write memory used as the ring buffer is the N-th power of two. Therefore, when the state number of the write address counter pointer 101 and the state number of the read address counter pointer 102 are different from each other by the N-th power of two (eight third power of two) in the example of FIG. 3) as illustrated in FIG. 3, the ring buffer is full. As is also apparent from FIG. 3, in view of the characteristic of the gray code, of the gray codes of the (N+1)-th power of two which are indicated by the (N+1) bits, gray codes which are different from each other by the N-th power of two in order number are gray codes in which higher two bits are not equal and respective bits including an (N−1)-th bit to the least significant bit are equal.

The read synchronization comparison operation section 109 compares the (N+1)-bit gray code output from the read address counter pointer 102 with the (N+1)-bit gray code which is output from the write address counter pointer 101 and synchronous with the read clock CR by the write pointer synchronization section 106, to detect whether or not the ring buffer is empty. Specifically, the gray codes are EXORed for each bit. When each EXOR value with respect to all bits exhibits one, the empty state may be determined.

That is, a case where the data of the ring buffer is empty corresponds to a case where the gray code output from the write address counter pointer 101 is equal to the gray code output from the read address counter pointer 102. In this case, all bits of the gray codes have the same value.

In FIG. 1, the full and empty signals output from each of the synchronization comparison operation sections 108 and 109 are used as the internal state signals. In general, the full signal is output to a write data transmission source (not shown) and the empty signal is output to a read data reception destination (not shown). In addition to the full signal and the empty signal, a last state before the full state, a last state before the empty state, the number of effective data, and the number of invalid data may be output as the internal state signals. In Embodiment 1, each of the synchronization comparison operation sections 108 and 109 compares the state of the write address counter pointer 101 with the state of the read address counter pointer 102. Therefore, when a difference between the state of the write address counter pointer 101 and the state of the read address counter pointer 102 is obtained, the states thereof may be output.

The read and write memory 104 includes the plurality of memory cells which may be selected by the write selection section 110 and the read selection section 111. The memory cells may be preferably selected for writing and reading at the same time. Well-known examples of the memory cells as described above include a dual port RAM cell and a data flip-flop circuit. That is, the read and write memory 104 preferably includes a plurality of dual port RAM cells or a plurality of data flip-flop circuits, which may asynchronously perform writing by the write selection section 110 and reading by the read selection section 111 at the same time.

[Embodiment 2]

When the same clock is used for the write clock CW and the read clock CR, Embodiment 1 may be applied to the ring buffer in which the write operation and the read operation are synchronous with each other. However, when it is known in advance that the write operation and the read operation are synchronous with each other, the circuit according to Embodiment 1 may be further simplified.

FIG. 6 is a block diagram illustrating the entire ring buffer circuit according to Embodiment 2. In FIG. 6, Embodiment 2 is different from Embodiment 1 in that a common clock is used for writing and reading, the write pointer synchronization section and the read pointer synchronization section are omitted, and a" single comparison operation section 112 for generating the internal state signals is provided. The other structure and operation are substantially the same as Embodiment 1. Therefore, the same reference numerals as in Embodiment 1 are used and the detailed description thereof is omitted.

When the write clock and the read clock are synchronous with each other, the write pointer synchronization section and the read pointer synchronization section are unnecessary because of the unnecessity of synchronization.

The comparison operation section may be shared. The EXORing of the write pointer (WP) value and the EXORing of the read pointer (RP) value in generating the full signal and the empty signal described in Embodiment 1 are identical to each other, and hence circuit sharing may be achieved to reduce a circuit area correspondingly. In Embodiment 2, the same fundamental circuit structure as in Embodiment 1 is employed. Therefore, a ring buffer circuit used also for non-synchronization and a ring buffer circuit used only for synchronization may share a fundamental design.

In Embodiment 2, the common clock is used for writing and reading. Therefore, when writing and reading are not performed at the same time, the read and write memory 104 may also have all or a part of addresses of a single port SRAM or a single port DRAM. In this case, the write selection section 110 and the read selection section 111 may be combined for sharing and the write address converter circuit 103 and the read address converter circuit 105 may be combined for sharing.

[Embodiment 3]

When a clock synchronous with the write clock CW and the read clock CR is used, the ring buffer circuit according to Embodiment 1 described above may be applied to the ring buffer circuit in which the write operation and the read operation are synchronous with each other. However, in the case where the write clock and the read clock are synchronous with each other, when the write pointer synchronization section 106 or the read pointer synchronization section 107 is bypassed, the ring buffer circuit may be operated at higher speed.

FIG. 7 is a block diagram illustrating the entire structure of a ring buffer circuit according to Embodiment 3. The ring buffer circuit according to Embodiment 3 is different from the ring buffer circuit according to Embodiment 1 as illustrated in FIG. 1 in that a write pointer selection section 113 and a read pointer selection section 114 are further provided and the write pointer selection section 113 and the read pointer selection section 114 are controlled based on a synchronous/asynchronous selection signal 115. The other structure and operation are substantially the same as Embodiment 1. Therefore, the same reference numerals as in Embodiment 1 are used and the detailed description thereof is omitted.

In FIG. 7, the write pointer selection section 113 is a selection circuit for selecting one of outputting, to the read synchronization comparison operation section 109, a value of the write address counter pointer 101 which is synchronous with the read clock by the write pointer synchronization section 106 and outputting a value of the write address counter pointer 101 directly to the read synchronization comparison operation section 109 without passing through the write pointer synchronization section 106. The synchronous/asynchronous selection signal 115 is input as a selection signal to the write pointer selection section 113. The synchronous/asynchronous selection signal is a signal indicating whether the write clock CW and the read clock CR are synchronous or asynchronous with each other. Upon receiving the synchronous/asynchronous selection signal 115, the write pointer selection section 113 outputs the value of the write address counter pointer 101 directly to the read synchronization comparison operation section 109 without passing through the write pointer synchronization section 106 in the case where the write clock and the read clock are synchronous with each other and thus the synchronization using the write pointer synchronization section 106 is unnecessary. In contrast to this, when the write clock CW and the read clock CR are asynchronous with each other, the write pointer selection section 113 outputs, to the read synchronization comparison operation section 109, the value of the write address counter pointer 101 which is synchronous with the read clock CR by the write pointer synchronization section 106.

The read pointer selection section 114 is a selection circuit for selecting one of outputting, to the write synchronization comparison operation section 108, a value of the read address counter pointer 102 which is synchronous with the write clock by the read pointer synchronization section 107 and outputting a value of the read address counter pointer 102 directly to the write synchronization comparison operation section 108 without passing through the read pointer synchronization section 107. The synchronous/asynchronous selection signal 115 is input as a selection signal to the read pointer selection section 114. Upon receiving the synchronous/asynchronous selection signal 115, the read pointer selection section 114 outputs the value of the read address counter pointer 102 directly to the write synchronization comparison operation section 108 in the case where the write clock and the read clock are synchronous with each other. When the write clock CW and the read clock CR are asynchronous with each other, the read pointer selection section 114 outputs an output value of the read pointer synchronization section 107 directly to the write synchronization comparison operation section 108.

In the ring buffer circuit according to Embodiment 3 described above, when the write clock CW and the read clock CR are synchronous with each other, whether or not the write pointer synchronization section 106 and the read pointer synchronization section 107 are bypassed may be selected based on the synchronous/asynchronous selection signal 115. The write pointer synchronization section 106 and the read pointer synchronization section 107 may be skipped in the case where the write clock CW and the read clock CR are synchronous with each other, and hence a synchronization time of the pointer synchronization sections (synchronization circuits) 106 and 107 may be shortened to operate the ring buffer circuit at higher speed.

When it is unnecessary to dynamically change between the synchronous and asynchronous operations of the ring buffer circuit in Embodiment 3, the synchronous/asynchronous selection signal 115 is held, and hence redundant circuits may be automatically removed by a current logical synthesis technology. For example, when the synchronous/asynchronous selection signal 115 is held for the synchronous operation, the write pointer selection section 113, the read pointer selection section 114, the write pointer synchronization section 106, and the read pointer synchronization section 107 are removed. Further, the write synchronization comparison operation section 108 and the read synchronization comparison operation section 109 may be combined for sharing to form a ring buffer circuit having the same structure as the ring buffer circuit 100A according to Embodiment 2 as illustrated in FIG. 6. When the synchronous/asynchronous selection signal 115 is held for the asynchronous operation, the write pointer selection section 113 and the read pointer selection section 114 may be removed to form a ring buffer circuit having the same structure as in Embodiment 1 illustrated in FIG. 1.

As described in more detail with reference to Embodiments 1, 2, and 3, according to the present invention, the (N+1)-bit gray code counters are used as the write pointer and the read pointer for the FIFO buffer (ring buffer) having the address space of the N-th power of two, and the addresses of the read and write memory are converted for address selection into the directly designated addresses by the address converter circuits, and hence the correct addresses may be selected. In the case where the gray codes are used, no abnormal code is output even in the metastable state at the instant when the count values of the counters are updated. Therefore, the gray codes may be used without depending on whether or not the write clock and the read clock are synchronous or asynchronous with each other. The gray code having the N+1 bits larger by one bit than the N bits required to designate the addresses of the read and write memory of the ring buffer circuit are used for each of the address counter pointers, and hence the full state and empty state of the ring buffer may be easily distinguished from each other. The multi-bit synchronization may be achieved, and hence the comparison may be made even when the write pointer and the read pointer are operated with different clocks, and thus the present invention may be applied to not only the synchronous FIFO buffer but also the asynchronous FIFO buffer. In addition, the address space "n" of n bits is represented by n+1 bits, and hence the full or empty signal may be more accurately output.

Hereinabove, the present invention is described with reference to the embodiments. The present invention is not limited to only the structures of the embodiments and thus includes various changes and medications which could be made by a person skilled in the art within the scope of the present invention.

What is claimed is:
1. A ring buffer circuit, comprising:
a read and write memory having addresses specified by N bits (N is an integer equal to or larger than two);
a write address counter pointer for counting an (N+1)-bit Gray code, the write address counter pointer being a counter pointer having an address which is updated for each writing into the read and write memory and returned to a first address to continue counting when the address reaches a final address;
a read address counter pointer for counting an (N+1)-bit Gray code, the read address counter pointer being a counter pointer having an address which is updated for each reading from the read and write memory and returned to the first address to continue counting when the address reaches the final address;
a write address converter circuit for converting the (N+1)-bit Gray code output from the write address counter pointer into an N-bit Gray code address which may be directly designated as a write address of the read and write memory; and
a read address converter circuit for converting the (N+1)-bit Gray code output from the read address counter pointer into an N-bit Gray code address which may be directly designated as a read address of the read and write memory.

2. A ring buffer circuit according to claim 1, wherein the read and write memory comprises a memory for performing writing in synchronization with a write clock and reading in synchronization with a read clock, the ring buffer circuit further comprising:
a read pointer synchronization section for outputting the (N+1)-bit Gray code from the read address counter pointer in synchronization with the write clock; and
a write synchronization comparison operation section for comparing the (N+1)-bit Gray code from the write address counter pointer with the (N+1)-bit Gray code output from the read pointer synchronization section.

3. A ring buffer circuit according to claim 2, wherein the write synchronization comparison operation section compares the (N+1)-bit Gray code from the write address counter pointer with the (N+1)-bit Gray code output from the read pointer synchronization section, and detects that the read and write memory is full when higher two bits of the (N+1)-bit Gray code from the write address counter pointer are not equal to higher two bits of the (N+1)-bit Gray code output from the read pointer synchronization section and when lower bits other than the higher two bits of the (N+1)-bit Gray code from the write address counter pointer are equal to lower bits other than the higher two bits of the (N+1)-bit Gray code output from the read pointer synchronization section.

4. A ring buffer circuit according to claim 1, wherein the read and write memory comprises a memory for performing writing in synchronization with a write clock and reading in synchronization with a read clock, the ring buffer circuit further comprising:
a write pointer synchronization section for outputting the (N+1)-bit Gray code from the write address counter pointer in synchronization with the read clock; and
a read synchronization comparison operation section for comparing the (N+1)-bit Gray code from the read address counter pointer with the (N+1)-bit Gray code output from the write pointer synchronization section.

5. A ring buffer circuit according to claim 4, wherein the read synchronization comparison operation section compares the (N+1)-bit Gray code from the read address counter pointer with the (N+1)-bit Gray code output from the write pointer synchronization section, and detects that the read and write memory is empty when N+1 bits of the (N+1)-bit Gray code from the read address counter pointer are all equal to N+1 bits of the (N+1)-bit Gray code output from the write pointer synchronization section.

6. A ring buffer circuit according to claim 2, wherein:
the read and write memory comprises a dual port memory including a write port and a read port; and
the write clock and the read clock are asynchronous with each other.

7. A ring buffer circuit according to claim 1, wherein the read and write memory comprises a dual port memory including a write port and a read port, for performing writing from the write port in synchronization with a write clock and reading from the read port in synchronization with a read clock, the ring buffer circuit further comprising:
a read pointer synchronization section for outputting the (N+1)-bit Gray code from the read address counter pointer in synchronization with the write clock;
a write pointer synchronization section for outputting the (N+1)-bit Gray code from the write address counter pointer in synchronization with the read clock;
a write pointer selection section for selectively outputting one of the (N+1)-bit Gray code output from the write address counter pointer and the (N+1)-bit Gray code output from the write pointer synchronization section, based on a synchronous/asynchronous selection signal indicating whether or not the write clock and the read clock are synchronous with each other;
a read pointer selection section for selectively outputting one of the (N+1)-bit Gray code output from the read address counter pointer and the (N+1)-bit Gray code output from the read pointer synchronization section, based on the synchronous/asynchronous selection signal;
a write synchronization comparison operation section for comparing the (N+1)-bit Gray code from the write address counter pointer with the (N+1)-bit Gray code output from the read pointer selection section; and
a read synchronization comparison operation section for comparing the (N+1)-bit Gray code from the read address counter pointer with the (N+1)-bit Gray code output from the write pointer selection section.

8. A control circuit for a ring buffer circuit having addresses specified by N bits (N is an integer equal to or larger than two), the control circuit comprising:
a read address counter pointer for designating a read address of the ring buffer circuit;
a write address counter pointer for designating a write address of the ring buffer circuit; and
a comparison operation section for comparing the read address and the write address to detect whether or not the ring buffer circuit is empty and whether or not the ring buffer circuit is full, wherein:
the read address counter pointer and the write address counter pointer each comprise a counter pointer for an (N+1)-bit Gray code; and
the control circuit further comprises an address converter circuit for converting the (N+1)-bit Gray, codes output from the read address counter pointer and the write address counter pointer into N-bit Gray code addresses for the ring buffer circuit.

9. A control circuit for a ring buffer circuit according to claim 8, wherein the address converter circuit comprises:
a read address converter circuit for converting the (N+1)-bit Gray code output from the read address counter pointer into an N-bit read address; and
a write address converter circuit for converting the (N+1)-bit Gray code output from the write address counter pointer into an N-bit write address.

10. A control circuit for a ring buffer circuit according to claim 9, wherein, when an initial Gray code address is a 0th address and an input (N+1)-bit Gray code address value is at least an (N-th power of two)-th address or later, the read address converter circuit and the write address converter circuit each convert the input (N+1)-bit Gray code address into an address preceding by the N-th power of two.

11. A control circuit for a ring buffer circuit according to claim 9, wherein the read address converter circuit and the write address converter circuit each directly set, as output bits, input bits including a least significant bit to an (N−1)-th bit, of an input (N+1)-bit Gray code, and further set, as an N-th output bit, an exclusive OR bit of higher two input bits including an N-th bit and an (N+1)-th bit, to thereby convert an address of the (N+1)-bit Gray code into the N-bit Gray code address.

12. A control circuit for a ring buffer circuit according to claim 9, wherein the read address converter circuit and the write address converter circuit each comprise a circuit for converting an input (N+1)-bit Gray code address into an (N+1)-bit binary code and outputting a lower N-bit binary code of the converted (N+1)-bit binary code, to thereby convert the (N+1)-bit Gray code address into an N-bit binary code address.

13. A control circuit for a ring buffer circuit according to claim 8, the control circuit being capable of controlling a ring buffer circuit into which data is written in synchronization with a write clock and from which data is read in synchronization with a read clock which is asynchronous with the write clock, wherein:
the control circuit further comprises:
a read pointer synchronization section for outputting the (N+1)-bit Gray, code from the read address counter pointer in synchronization with the write clock; and
a write pointer synchronization section for outputting the (N+1)-bit Gray code from the write address counter pointer in synchronization with the read clock; and
the comparison operation section comprises:
a write synchronization comparison operation section for comparing the (N+1)-bit Gray code from the write address counter pointer with the (N+1)-bit Gray code output from the read pointer synchronization section in synchronization with the write clock; and
a read synchronization comparison operation section for comparing the (N+1)-bit Gray code from the read address counter pointer with the (N+1)-bit Gray code output from the write pointer synchronization section in synchronization with the read clock.

14. A control circuit for a ring buffer circuit according to claim 13, wherein the write synchronization comparison operation section detects that the ring buffer circuit is full when higher two bits of the (N+1)-bit Gray code from the write address counter pointer are not equal to higher two bits of the (N+1)-bit Gray code output from the read pointer synchronization section and when lower bits other than the higher two bits of the (N+1)-bit Gray code from the write address counter pointer are all equal to lower bits other than the higher two bits of the (N+1)-bit Gray code output from the read pointer synchronization section.

15. A control circuit for a ring buffer circuit according to claim 13, wherein the read synchronization comparison operation section detects that the ring buffer circuit is empty when an N+1 bit value of the (N+1)-bit Gray code from the read address counter pointer is equal to an N+1 bit value of the (N+1)-bit Gray code output from the write pointer synchronization section.

16. A control circuit for a ring buffer circuit according to claim 13, the control circuit further comprising:
- a write pointer selection section for selectively outputting one of the (N+1)-bit Gray code output from the write address counter pointer and the (N+1)-bit Gray code output from the write pointer synchronization section, based on a synchronous/asynchronous selection signal indicating whether or not the write clock and the read clock are synchronous with each other; and
- a read pointer selection section for selectively outputting one of the (N+1)-bit Gray code output from the read address counter pointer and the (N+1)-bit Gray code output from the read pointer synchronization section, based on the synchronous/asynchronous selection signal, wherein:
- the write synchronization comparison operation section compares the (N+1)-bit Gray code from the write address counter pointer with the (N+1)-bit Gray code output from the read pointer selection section; and
- the read synchronization comparison operation section compares the (N+1)-bit Gray code from the read address counter pointer with the (N+1)-bit Gray code output from the write pointer selection section.

17. A control circuit for a ring buffer circuit according to claim 8, wherein the comparison operation section compares the (N+1)-bit Gray code from the read address counter pointer with the (N+1)-bit Gray . code output from the write address counter pointer, detects that the ring buffer circuit is full when higher two bits of the (N+1)-bit Gray code from the read address counter pointer are unequal to higher two bits of the (N+1)-bit Gray code output from the write address counter pointer and when lower bits other than the higher two bits of the (N+1)-bit Gray code from the read address counter pointer are all equal to lower bits other than the higher two bits of the (N+1)-bit Gray code output from the write address counter pointer, and detects that the ring buffer circuit is empty when N+1 bits of the (N+1)-bit Gray code from the read address counter pointer are all equal to N+1 bits of the (N+1)-bit Gray code output from the write address counter pointer.

* * * * *